United States Patent
Foldes

[11] 3,903,808
[45] Sept. 9, 1975

[54] EDDY CURRENT PROPULSION SYSTEM

[76] Inventor: Andrew Foldes, Box 1094, Elizabeth, Colo. 80107

[22] Filed: Sept. 18, 1972

[21] Appl. No.: 290,035

[52] U.S. Cl. ..... 104/148 LM; 104/148 MS; 335/306
[51] Int. Cl. .......................................... H02k 41/02
[58] Field of Search. 104/148 LM, 148 MS, 148 SS; 335/306

[56] References Cited
UNITED STATES PATENTS

| | | | |
|---|---|---|---|
| 2,745,027 | 5/1956 | Williford | 335/306 X |
| 3,610,972 | 10/1971 | Pelenc | 104/148 LM |
| 3,628,072 | 12/1971 | Nicholson | 104/148 LM |

Primary Examiner—Robert J. Spar
Assistant Examiner—George F. Abraham

[57] ABSTRACT

A vehicle is provided with a variable-pitch eddy-current propulsion system. As part of the propulsion system, the vehicle is equipped with a prime mover and two rotors mechanically coupled to the prime mover for rotation thereby. Each of the rotors carries a plurality of magnetic elements helically distributed on the rotor. In operation the magnetic elements carried by the rotors induce currents in two conductive rails of arcuate cross-section respectively disposed adjacent the rotors. These induced currents have associated magnetic fields which interact with the magnetic field of the helically distributed magnetic elements to develop forces on the rotors. Levitating forces, lateral stabilizing forces and thrust forces are all controllably developed. Central to the control of these forces is the speed of rotation of the prime mover, the helix pitch of the helically distributed magnetic elements carried by the rotors, and the field strengths of the magnetic elements.

18 Claims, 18 Drawing Figures

HELIX ANGLE — α α
AXIS OF ROTOR

EDDY CURRENT PROPULSION SYSTEM

This invention relates to an eddy-current propulsion system.

Linear motor propulsion systems have been suggested and investigated for use in various passenger conveyance systems including elevators, mass transit trains, personal transport cars carrying only a few passengers, and other conveyances wherein the passenger compartment or vehicle is propelled along a fixed roadway from point or origin to point of destination. The present invention provides a propulsion system for a vehicle of the type adapted to follow a fixed roadway wherein all the active elements of the system are carried by the vehicle. The active elements produce magnetic fields that interact with an elongated conductive rail disposed on the roadway to thereby generate reactive forces providing vehicle propulsion. The conductive rail is positioned in a fashion to define the path of travel for the vehicle. For example, if the vehicle is an elevator the rail traverses the vertical path followed by the elevator, whereas if the vehicle is a personal transport car the rail traverses the substantially horizontal path from point of origin to point of destination which the vehicle will follow.

In the present invention vehicle thrust and support forces are developed through a two-fold conversion of energy. First mechanical energy is converted into electromagnetic energy, and, subsequently, this electromagnetic energy is reconverted into mechanical energy. Through this process propulsion or thrust forces are controllably developed to mobilize the vehicle. Additionally, levitating and lateral stabilizing forces are controllably generated in the eddy-current propulsion system of the present invention.

Accordingly, it is an object of the present invention to provide an eddy-current propulsion system for passenger conveyances wherein a controllable thrust is developed. In general this is accomplished in a system including a prime mover, a rotatable member mechanically coupled with the prime mover for rotation thereby, a stationary elongated conductive member, and means for developing magnetic fields in both the rotatable member and the stationary elongated conductive member during rotation by the rotatable member such that the magnetic fields interact to develop longitudinal forces on the rotatable member tending to propel the vehicle.

It is another object of the present invention to provide an eddy-current propulsion system including a prime mover, a rotatable member mechanically coupled with the prime mover for rotation thereby, a plurality of magnetic elements helically distributed on the rotatable member, a stationary elongated conductive member disposed adjacent the rotatable member such that the magnetic elements of the rotable member induce currents in the stationary elongated conductive member during rotation by the rotatable member which induced currents have associated magnetic fields that interact with the magnetic field of the magnetic elements to develop longitudinal forces on the rotatable member tending to propel the vehicle.

It is another object of the present invention to provide an eddy-current propulsion system wherein the helix pitch of helically distributed magnetic elements carried by a rotatable member is controlled to thereby control the forces on the rotatable member.

It is another object of the present invention to provide an eddy-current propulsion system wherein the helix pitch of helically distributed magnetic elements carried by a rotatable member is controllable such that the thrust forces on the rotatable member can be reversed to effect braking in the eddy-current propulsion system.

It is another object of the present invention to provide an eddy-current propulsion system including means for controllably axially displacing respective magnetic elements carried by a rotatable member of the system.

It is another object of the present invention to provide an eddy-current propulsion system including means for controllably circumferentially displacing respective magnetic elements carried by a rotatable member of the system.

The instant invention, together with further objects and advantages thereof, can be best understood by reference to the following description of the preferred embodiments, taken in connection with the accompanying drawings, in which.

Figure 1:
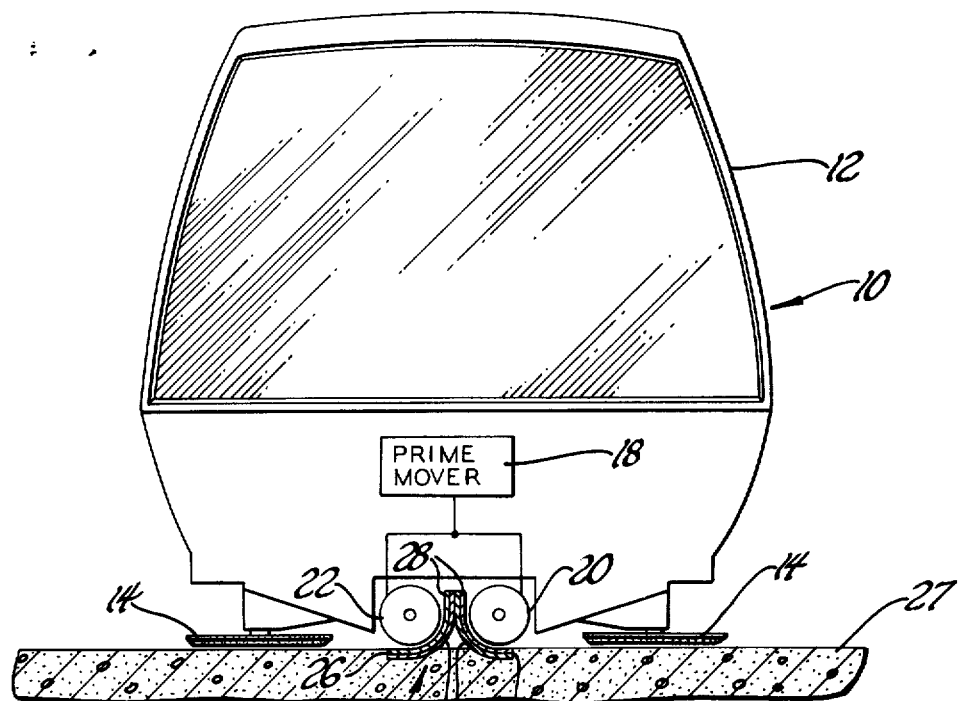
FIG. 1 is a schematic of a vehicle including the eddy-current propulsion system of the present invention.

Reference should now be made to the drawings and in particular to FIG. 1 wherein the eddy-current propulsion system of the present invention is illustrated in conjunction with a vehicle generally designated 10. The vehicle 10 includes a passenger compartment 12 and ground support or lift elements 14. The left elements 14 are in the form of pads for an air cushion; of course, the lift elements 14 can take many forms including conventional pneumatic wheels without significance to the present invention. In the vehicle 10, the eddy-current propulsion system generally designated 16 is capable of developing thrust, braking, levitating, and laterally stabilizing forces during operation.

The propulsion system 16 includes a prime mover 18 such as a dc or ac rotary motor coupled to first and second rotors 20 and 22 which are mounted in side-by-side relationship mutually parallel to the longitudinal centerline of the vehicle 10. The rotors 20 and 22 cooperate with first and second elongated metal rails 24 and 26, respectively, which extend continuously along and are fixed with respect to the roadbed 27. The rails 24 and 26 are bimetallic members of arcuate cross-section having reversely similar portions 28 comprised of an electrically conductive material such as copper or aluminum and portions 30 comprised of ferromagnetic material. The propulsion system 16 of the vehicle 10 also includes a means described hereinafter with reference to FIGS. 2–5 for developing magnetic fields circulating in the rotors 20 and 22 and magnetic fields circulating in the rails 24 and 26. These magnetic fields interact to develop forces on the rotors 20 and 22 thereby providing levitation, thrust, and lateral support to the vehicle 10.

Figure 2:
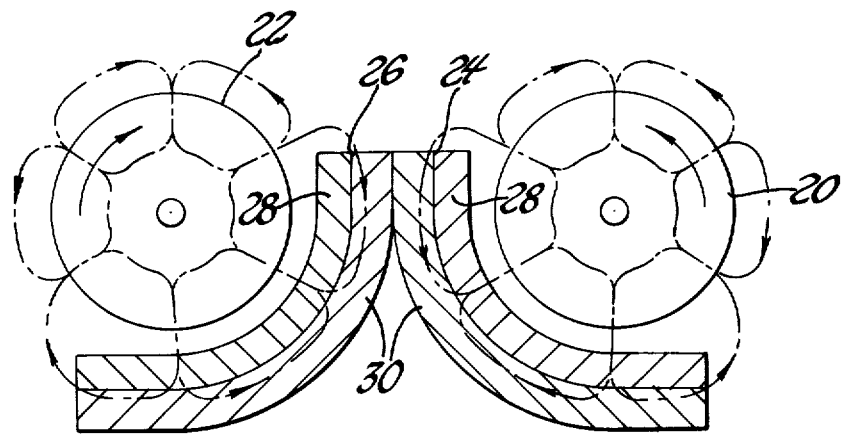
FIG. 2 is an enlarged view of the arcuate rail and adjacently disposed rotors of the propulsion system included in the vehicle of FIG. 1.

As illustrated in FIGS. 2–5, the means for developing magnetic fields in the rotors and rails comprises a plurality of magnetic elements carried by each of the rotors 20 and 22. As illustrated in FIG. 2, the magnetic fields emanating from the magnetic elements carried by the rotors 20 and 22 intersect respectively the rails 24 and 26. During intervals in which the rotors 20 and 22 are driven by the prime mover 18, the rotors will move past the respective rails in the directions indicated on the drawing: rotor 20 rotates counter-clockwise and rotor 22 rotates clockwise. As the rotors are rotated, electrical currents and voltages are induced in the conductive portions 28 of the respective rails 24 and 26 by the time changing magnetic fields intersecting these conductive portions. These induced currents generate magnetic fields circulating about the induced currents which fields interact with the magnetic fields of the elements carried by the rotors 20 and 22. The ferromagnetic portions 30 afford efficient return paths for the flux emanating from the rotors and passing through the conductive portions 28.

Figure 2A:
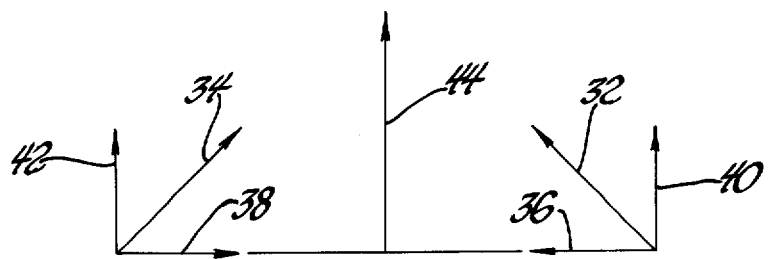
FIG. 2A is a vector diagram of the forces on the rotors of FIG. 2.

The rotation of rotors 20 and 22 generates forces on the rotors in a plane perpendicular to the axes of the rotors. Theses forces are shown vectorially in FIG. 2A. Additionally, as discussed hereinafter, axial or thrust forces are also developed on the rotors 20 and 22. A more precise analysis of the forces developed is given hereinafter, for the present it is sufficient to note that the forces are of the nature of drag or eddy-current coupling forces. Accordingly, the forces illustrated vectorially in FIG. 2A are the composites of forces distributed over the surfaces of the rotors 20 and 22. Forces are developed on the rotors 20 and 22 over the areas which interact with the fields circulating about the currents induced in the rails 24 and 26. As discussed hereinafter, the forces can have axial components as well as the components illustrated in FIG. 2A. Vectors 32 and 34 are the resultant forces in a plane perpendicular to the axes of the rotors; these resultants are oriented parallel to tangents drawn to the rotors at the midpoints of the above-mentioned areas of interaction. If the rotors were displaced from the equilibrium positions, of course, the force vectors representing the resultant forces would not coincide with the vectors 32 and 34. The resultant forces 32 and 34 can be resolved into the illustrated component forces: lateral forces 36 and 38 and levitating forces 40 and 42.

The levitating forces 40 and 42 tend to lift the vehicle 10 and thereby assist the support elements 14 during operation. The lateral forces 36 and 38 are stabilizing forces cancelling out when the rotors are symmetrically positioned about the rails; in this situation the only forces in a plane perpendicular to the axes of the rotors are the levitating forces 40 and 42 and the resultant of these two forces in the force vector 44. It is noteworthy that the lateral stabilizing forces 36 and 38 urge the vehicle toward the equilibrium position of symmetry relative to the rails. For example, if the rotors in FIG. 2 are displaced laterally to the left, the force 38 on the rotor 22 will increase in magnitude whereas the force 36 on the rotor 20 will decrease in magnitude. As a result, the lateral stabilizing forces 36 and 38 will not be balanced and the resultant force will urge the rotors 20 and 22 to the right, i.e., toward the equilibrium position.

Figure 3:
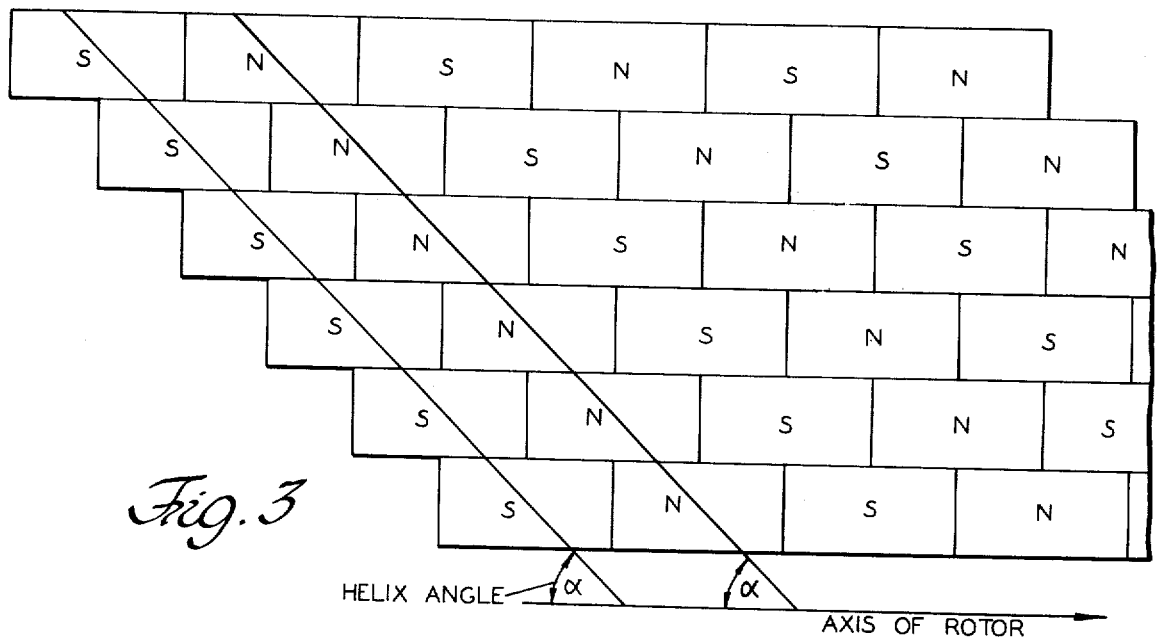
FIG. 3 is a plan view of the magnetic elements carried by one of the rotors of FIG. 2.

Thrust forces on the rotors 20 and 22 are developed in the instant propulsion system when the magnetic elements carried by the rotors 20 and 22 are helically distributed on the rotors. FIG. 3 is a plan view of a helical distribution of magnetic elements for the rotors 20 and 22. The magnetic elements are arranged in six rows of alternating north (N) and south (S) elements. In the south elements at the extreme left of each of the six rows were in alignment, the helix pitch of the rotor depicted would be zero and the helix angle would be 90°. (The helix angle alpha, as shown on the drawing, is the angle between the axis of the rotor and the lines connecting the midpoints of the rows of elements.) At zero pitch the only forces on the rotors are the forces in the plane perpendicular to the axes of the rotors illustrated in FIG. 2A. In the array shown in FIG. 3, however, the helix has an angle alpha and thrust forces are generated when the rotors 20 and 22 are driven by the prime mover 18, and propulsion of the vehicle 10 results. Of course, lateral and levitating forces in the plane perpendicular to the rotor axes are simultaneously developed; these forces are represented in FIG. 2A. The specifics of the electromagnetic interaction producing these forces are given below in conjunction with FIGS. 8 and 9. At present, it is sufficient to recognize that thrust forces require a helical distribution of magnetic elements.

Figure 4:
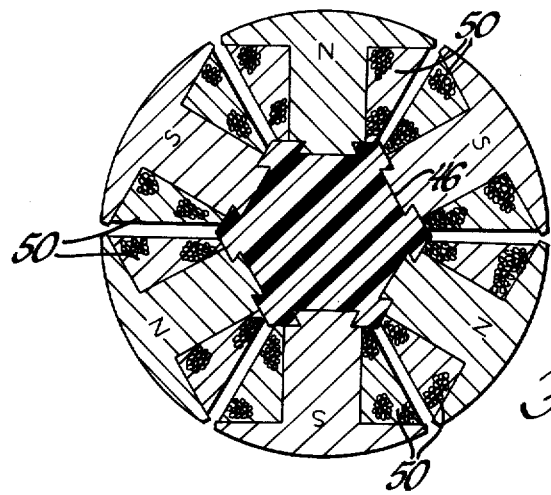
FIG. 4 is a sectioned view of one of the rotors of FIG. 2.
Figure 5:
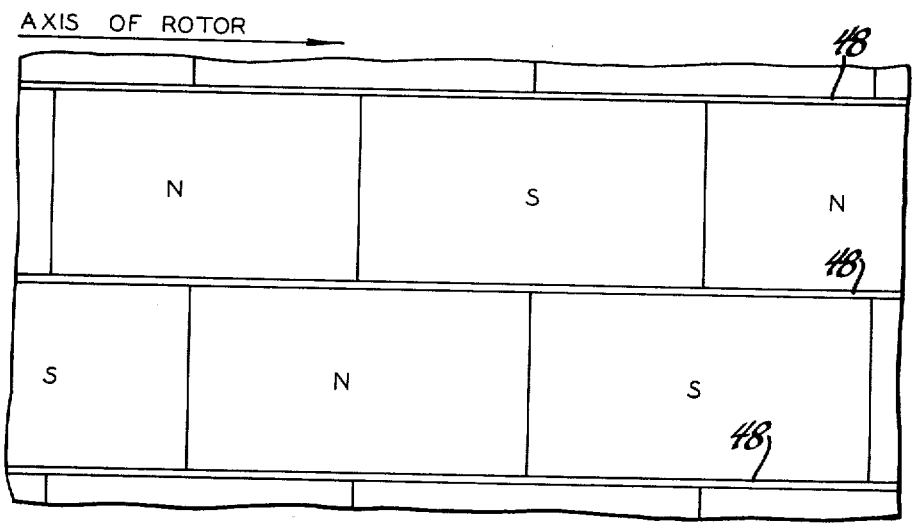
FIG. 5 is a sectioned view at the circumference of the rotor of FIG. 4.

The helix pitch for the magnetic elements shown in plan view in FIG. 3 is adjusted by axially displacing the rows of magnetic elements. To facilitate such axial displacement, the magnetic elements can be dovetailed or slotted in a six-sided rotor core 46 in the manner shown in FIG. 4. The rotor core 46 comprises magnetic material and the slots therein are of sufficient length to permit axial displacement of the magnetic elements to control the helix angle alpha over a predetermined range. FIG. 5 is a sectioned view at the circumference of the rotor of FIG. 4 depicting the clearances 48 between rows of elements to facilitate axial movement. More detail of the means for controlling the mechanical alignment of the magnetic elements will be given below in conjunction with FIGS. 13 and 14.

In FIG. 4 the magnetic elements are dc electromagnets having windings 50 and respective cores denoted north (N) and south (S). In the alternative, permanent magnets could be used in the rotors 20 and 22 to generate the requisite magnetic fields. Other fields generation techniques could also be substituted without affecting the present invention.

Figure 6:
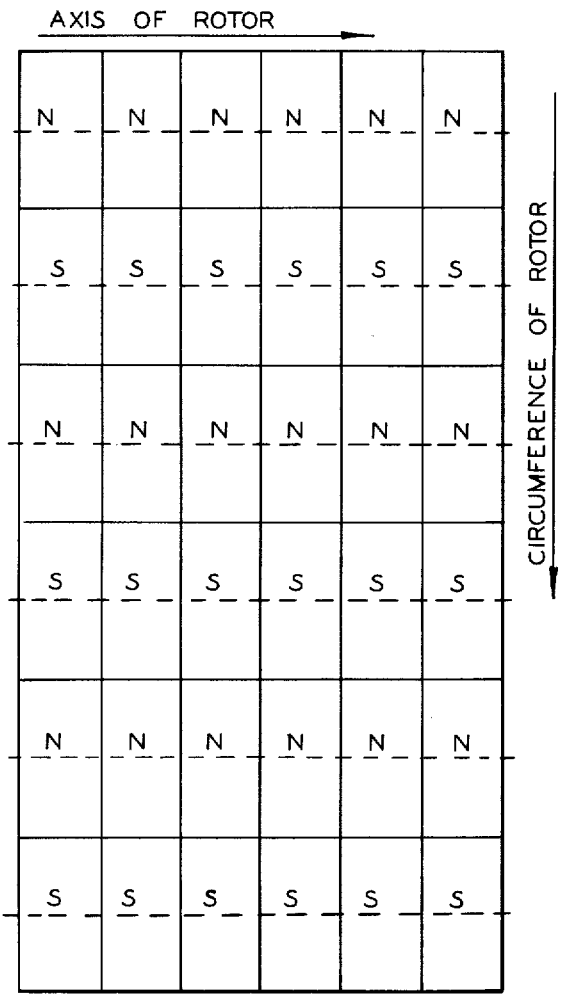
FIG. 6 is a plan view of the magnetic elements of a rotor in the aligned or zero pitch position.
Figure 7:
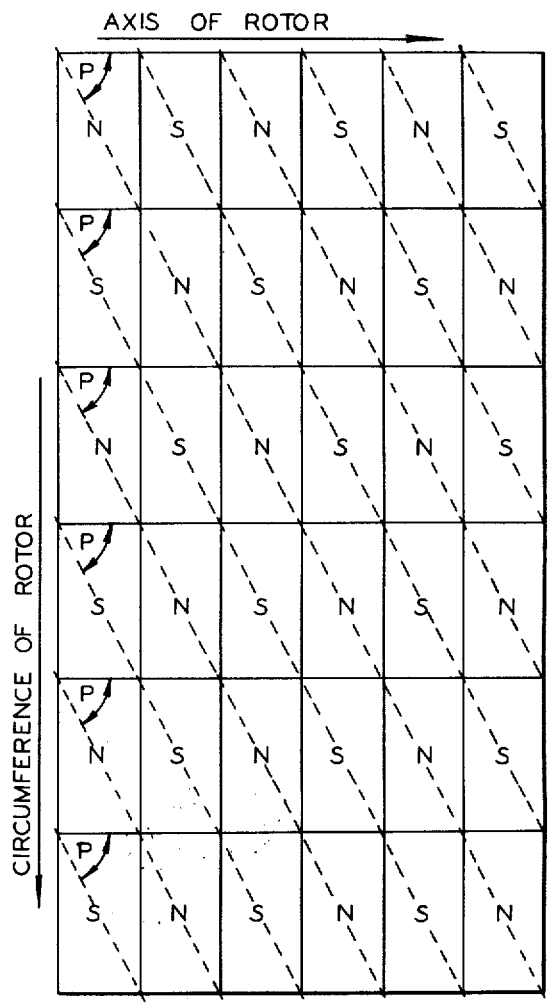
FIG. 7 is a plan view of the magnetic elements of a rotor at a pitch angle P.

The generation of forces on the rotors 20 and 22 will now be explained in conjunction with FIGS. 6–9. FIG. 6 is a plan view of the magnetic elements of a rotor in an aligned or infinite pitch array (pitch angle equals 180°). FIG. 7 is a plan view of the magnetic elements of a rotor in an array having a pitch angle P. For simplicity, the plan views of the magnetic elements in FIGS. 6 and 7 are represented as rectangular arrays. Of course these configurations cannot be attained by axially displacing the rows of magnetic elements shown in FIG. 3 above. However an alternative means for adjusting the helix pitch developed below in conjunction with FIG. 14 relating to circumferentially displacing magnetic elements affords a mechanism for achieving these rectangular arrays. Again, as with the mechanical specifics of the axial alignment system, the mechanical specifics of this circumferential system will be deferred.

Figure 8:
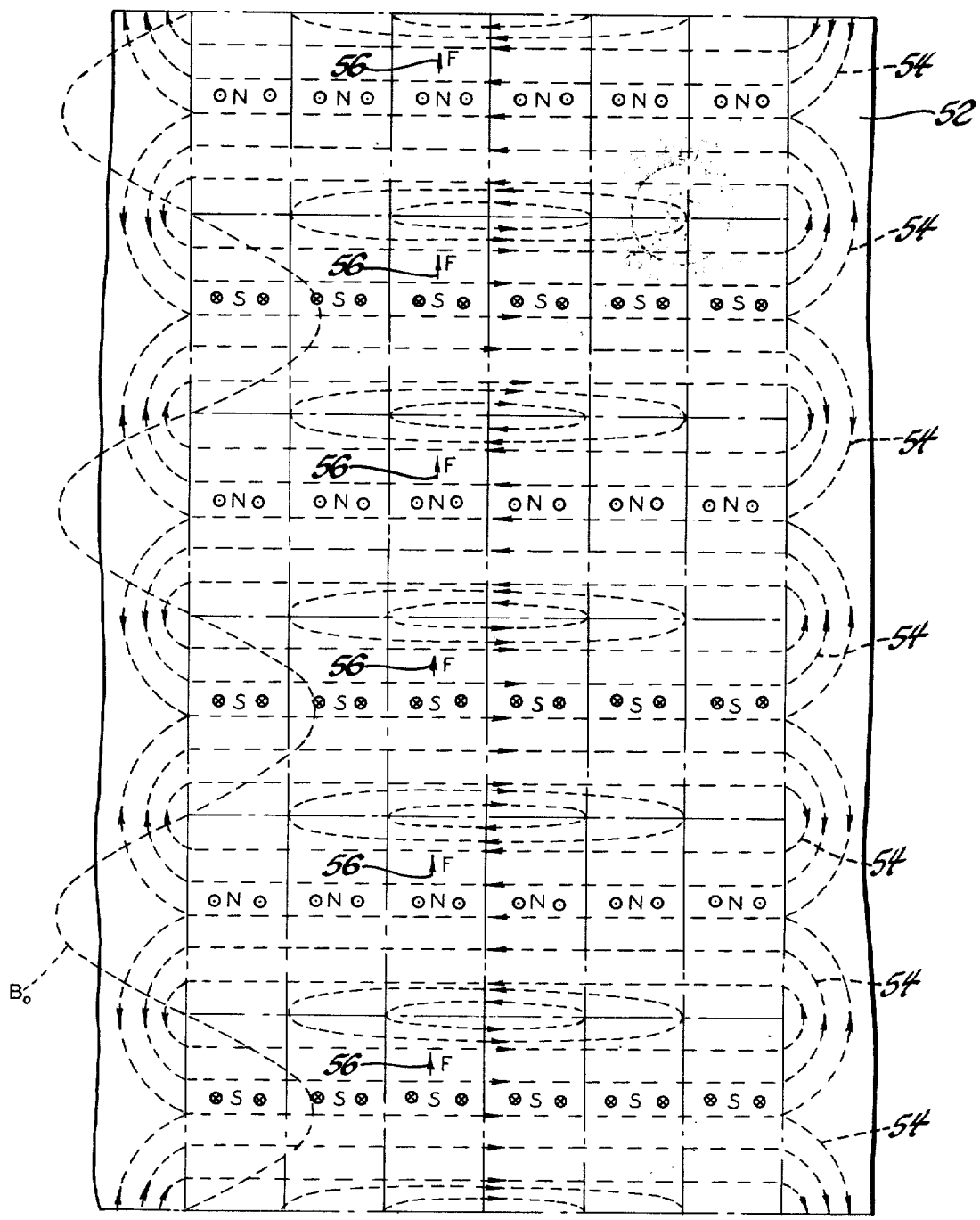
FIG. 8 is a plan view of a section of rail showing the fields, voltages, currents, and forces developed during operation of the propulsion system when the pitch of the magnetic elements of the associated rotor is zero as shown in FIG. 6.

In FIG. 8 a sectioned plan view of a rail 52 disposed adjacent a rotor (not illustrated) carrying the magnetic element array of FIG. 6 is illustrated. For simplicity the rail 52 is depicted as if it completely enclosed the rotor carrying the array of FIG. 6. Although, in the propulsion system illustrated in FIGS. 1 and 2, the rails 24 and 26 do not nearly enclose the rotors 20 and 22, the rails of an alternative embodiment of the present invention discussed hereinafter and shown schematically in FIG. 10 do substantially enclose the rotors of that embodiment. Accordingly, for simplicity, a coaxial rail-rotor arrangement is assumed for the present explanation. This assumption does not detract from the validity of the conclusion, but it does simplify the analysis.

The flux emanating from the magnetic array and impinging on the rail 52 is illustrated in FIG. 8 as a sinusoid $B_o$; $B_o$ is a function in time in view of the rotation of the magnetic array. At the instant in time depicted in FIG. 8 the flux from the magnetic array circulates through the conductor portion of the rail 52 with the vector senses illustrated in the drawing. The flux from the array establishes a flux pattern in the rail 52 which is a mirror image of the array itself; this is illustrated in FIG. 8 by the phantom drawing of the array. The flux has the highest intensity with sense into the rail along the lines marked with S's (south) having X's enclosed in circles. The lines marked with N's (north) having dots enclosed in circles represent the liness of maximum flux intensity oriented out of the rail.

Assuming that the rotor carrying the array of FIG. 6 sweeps from the bottom of the drawing of FIG. 8 to the top, the magnetic field impinging on the rail 52 as a result of the field emanating from the magnetic array will move from the bottom to the top in synchronism with the movement of the rotor. This time-changing magnetic field induces an electric field in the conductor portion of the rail 52 to thereby generate circulating currents 54 which are illustrated in the drawing. The electric field induced in the rail 52 is defined by the equation: $\vec{E} = \vec{U} \times \vec{B}$ where $\vec{U}$ is the velocity for charges in the conductor relative to the magnetic field $B_0$. This relative velocity for charges in the rail 52 is equal in amplitude but opposite in direction to the velocity of the array relative to the rail 52; accordingly, this velocity $\vec{U}$ is from top to bottom in the drawing. Taking the cross product to determine the sense of the electric field reveals that the electric field along the lines of X's enclosed in circles in from left to right on the drawing, and the electric field along the lines of dots enclosed in circles is from right to left on the drawing.

Correlating the flux sinusoid $B_0$ with the electric field induced in the conductor portion of the rail 52 reveals that each negative half-cycle of $B_o$ is associated with electric fields having a vector direction from left to right on the drawing, whereas each positive half-cycle of the flux $B_o$ is associated with electric fields having a vector direction from right to left on the drawing. Of course, the magnitude of the electric field varies in the same fashion as the magnetic flux, and, therefore, the magnitude of the electric field is proportional to the sinusoid defining the flux $B_o$.

The electric field induced in the rail 52 causes currents having the same direction as the electric field. Accordingly the circulating currents 54 depicted on the drawing are also representative of the electric field vectors resulting from the rotation of the magnetic elements on the rotor. The induced currents 54 are circulating currents and, accordingly, the currents 54 close at the ends of the current pattern on the drawing.

The forces on the rails 52 are defined by the formula: $\vec{F} = \vec{J} \times \vec{B}$ where $\vec{B}$ is the sinusoid $B_o$ having the sense indicated by the X's in circles and the dots in circles as noted above. The current $\vec{J}$ is shown by the circulating currents 54 on the drawing. Taking the cross product $\vec{J} \times \vec{B}$ reveals that the force $\vec{F}$ on the rail 52 is a force tending to pull the rail along with the magnetic field pattern of the rotor. Accordingly, forces 56 in the drawing represent the forces on the rail 52; these forces 56 are directed from bottom to top on the rail 52 as illustrated.

The rotor is subjected to a force equal to but oppositely directed to the cumulative resultant of the forces 56. Accordingly, this reaction force is a drag on the rotating rotor tending to reduce its angular velocity. It is important to note that a distributed drag force is developed over the surface of the rotor passing the rail 52 everywhere that surface confronts, i.e., is in the proximity with, the rail 52. Accordingly, drag forces are developed on the rotors 20 and 22 of FIG. 2 only along the arcs disposed adjacent the rails 24 and 26. For the arrangement of FIG. 8, there is no levitating or lateral force as long as the rotor is coaxial with the enclosing rail, i.e., in equilibrium; the levitating and lateral forces cancel out in view of the symmetry of the system. However, any deviation from the fully enclosed coaxial example leaves forces uncancelled by symmetrical forces diametrically opposite. Thus, in all situations, except the example, forces generated in the manner discussed produce levitating and lateral components similar to those of FIG. 2A.

Considering again the rotors 20 and 22 and the rails 24 and 26 of FIG. 2 together with the vector diagrams of FIG. 2A, it is evident that there is a drag force on the rotor 20 tangent to that rotor at each point along the circumference where the rotor 20 confronts the rail 24. This force urges the rotor 20 to rotate clockwise. The resultant force 32 of the vector diagrams of FIG. 2A is the composite of all the surface forces on the rotor 20. This force 32 can be broken into its constituents represented as a lateral force 36 and a levitating force 40. Similarly the resultant force 34 resists the rotation of the rotor 22. Again the resultant 34 can be considered in terms of its lateral components 38 and its levitating component 42.

As was discussed above the forces associated with a rotor having a helix angle of 180° are all in a plane perpendicular to the axes of the rotors. This is graphically shown in the schematic of FIG. 8: the only forces developed in FIG. 8 are in a plane perpendicular to the rotor axis.

The array in the plan view of FIG. 7 has a helix angle of P degrees. The analysis for a rotor carrying the magnetic array of FIG. 7 and its interaction with a substantially enveloping rail is analogous to the foregoing analysis of the array of FIG. 6 and the rail of FIG. 8. The fields, currents, and voltages generated in a rail 58 enveloping the magnetic array of FIG. 7 are shown graphically in FIG. 9.

Each circumferential row of six magnetic elements in the array of FIG. 7 induces an identical, but spatially displaced, voltage and current distribution in the rail 58. The magnetic flux incident on the rail 58 is a mirror reflection of the array of FIG. 7. The phantom lines on the drawing of FIG. 9 define the array relfection in the rail 58. The magnetic flux incident on the rail along the circumferential row at the left edge of the rail 58 is denoted $B_1$ in FIG. 9. This sinusoid is time displaced for each succeeding circumferential row proceeding from left to right. In each of the succeeding circumferential rows only one positive half-cycle of the relevant flux sinusoid is illustrated. The flux sinusoid for the second row is $B_2$, for the third row $B_3$, for the fourth row $B_4$, for the fifth row $B_5$, and for the sixth row $B_6$. Each of the sinusoids $B_1$ through $B_6$ produces a field and current distribution in its reflected area of the rail according to the concepts developed above for FIG. 8. The resultant currents are illustrated as circulating currents 60 at an angle P in FIG. 9.

Figure 9:
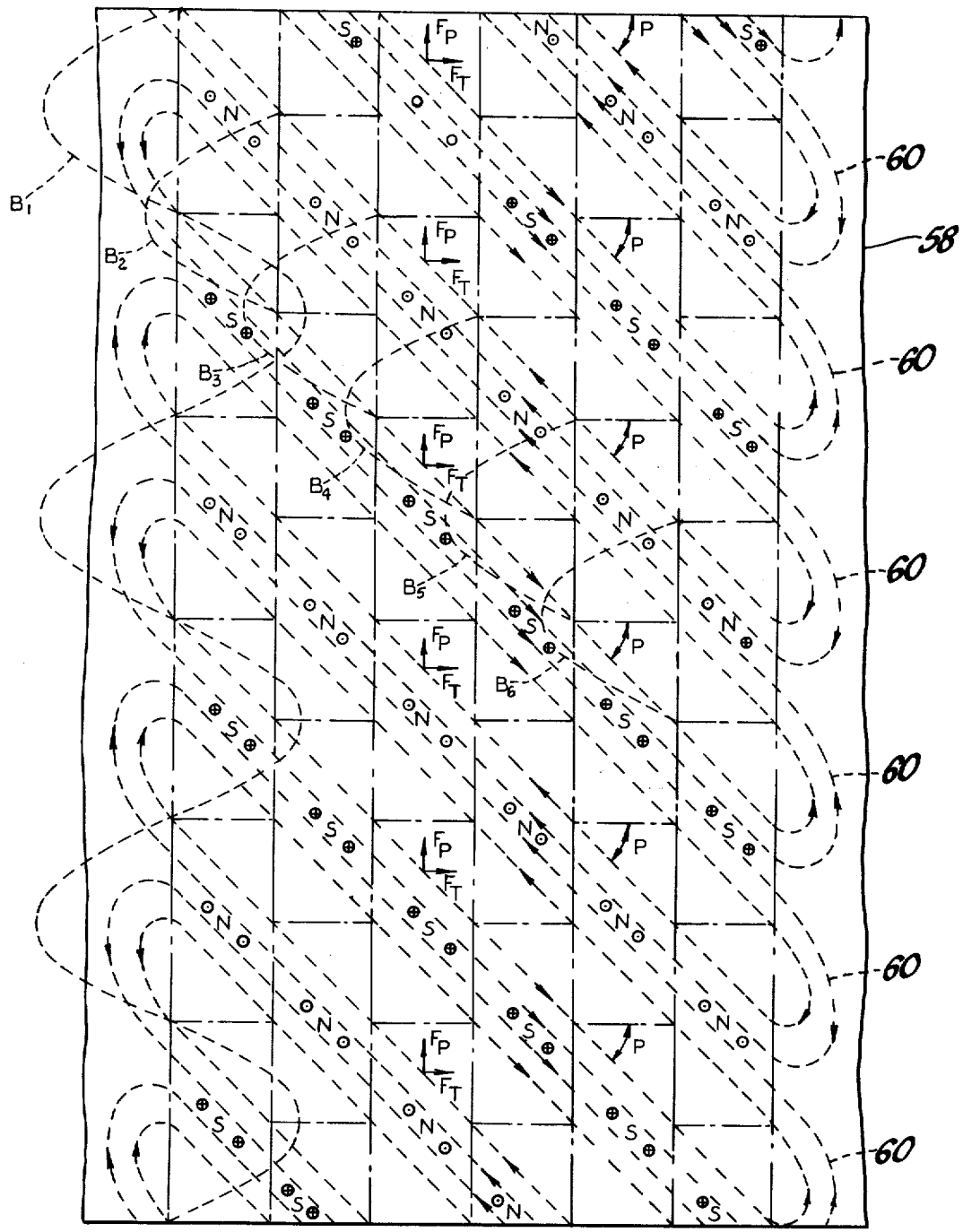
FIG. 9 is a plan view of a section of rail showing the fields, currents, voltages, and forces developed during operation of the propulsion system when the magnetic elements are disposed at a pitch angle P as depicted in FIG. 7.

The forces on the rail are again defined by the formula: $\vec{F} = \vec{J} \times \vec{B}$. In FIG. 9 the forces have components in the plane perpendicular to the axis of the rotor as well as axial or thrust components. The force on the rail 58 in the plane perpendicular to the axis is denoted $F_P$ on the drawing. This force and its reaction force on the rotor is analyzed according to the principles applied with respect to FIG. 8.

The thrust force developed by the helical array of magnetic elements in FIG. 7 does not have a counterpart in the force pattern for the array of FIG. 6. This thrust force on the rotor is the reaction force of the force $F_T$ on the rail 58 shown in the drawing of FIG. 9. The resultant of the forces $F_T$ and $F_P$ in FIG. 9 is the total force on the rail 58 of FIG. 9 and is defined by $\vec{F} = \vec{J} \times \vec{B}$.

The thrust force on the rotor carrying the array of FIG. 7 has a sense opposite to the force $F_T$ shown in FIG. 9. Accordingly the rotor will be accelerated from right to left by the reaction complement of the illustrated force $F_T$.

Thrust forces generated in the manner set forth above in conjunction with FIG. 9 are operative to drive the vehicle 10 of FIG. 1 axially along the rails 20 and 22. This linear motor drive provides controllable thrust and controllable speeds for the vehicle 10. In operation combined consideration of the slip frequency for the linear motor, the speed of rotation of the rotatable members, and the pitch of the helical fields is necessary to ascertain the thrust and translational velocity for the vehicle 10. Additionally the field strength of the magnetic elements also effects performance of the thrust system. The speed of rotation of the rotatable members can be controlled by controlling the speed of the prime mover 18 or by connecting the prime mover through a suitable gearing arrangement to the rotors. The slip can be controlled by controlling the synchronous speed of the axially traveling wave pattern on the reacting rail; in this manner thrust is produced throughout the entire speed range at high efficiency and power factor.

As suggested hereinabove control of the helix angle permits adjusting the helix angle to effect braking for the vehicle 10. A first approach to braking is to change the sign of the helix angle to thereby "plug" the linear motor. The plugging will effectively brake the vehicle 10. A second approach to braking for the linear motor is to operate in a regenerative mode achieved by increasing the helix angle to provide negative slip between the rotors and the reacting rails. An alternative to the foregoing braking arrangements is a reversal of rotation for the prime mover. This is effectively the same as changing the sign of the helix angle to plug the linear motor.

Figure 10:
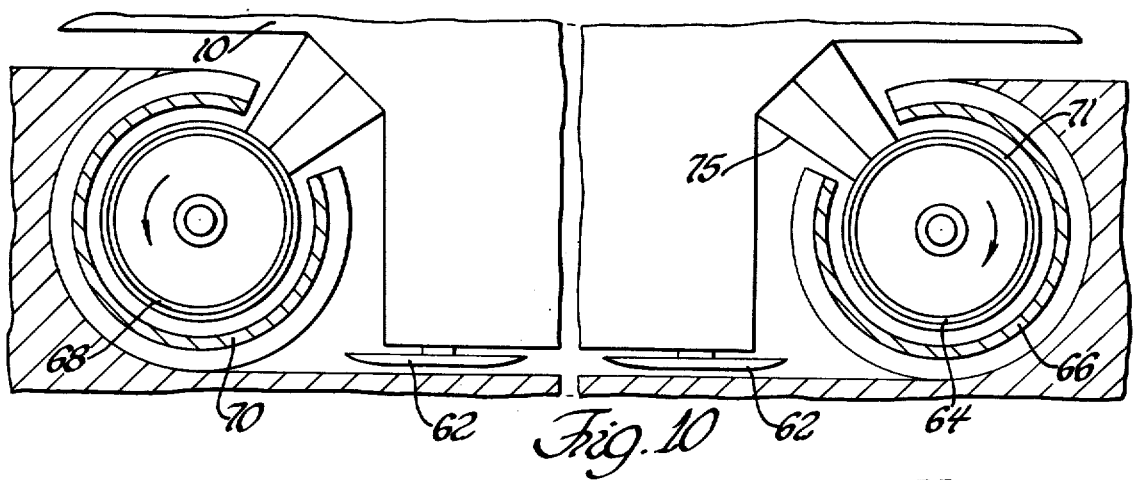
FIG. 10 is a schematic of a propulsion system according to the present invention wherein the rails disposed adjacent the rotors substantially envelope the respective rotors.
Figure 11:
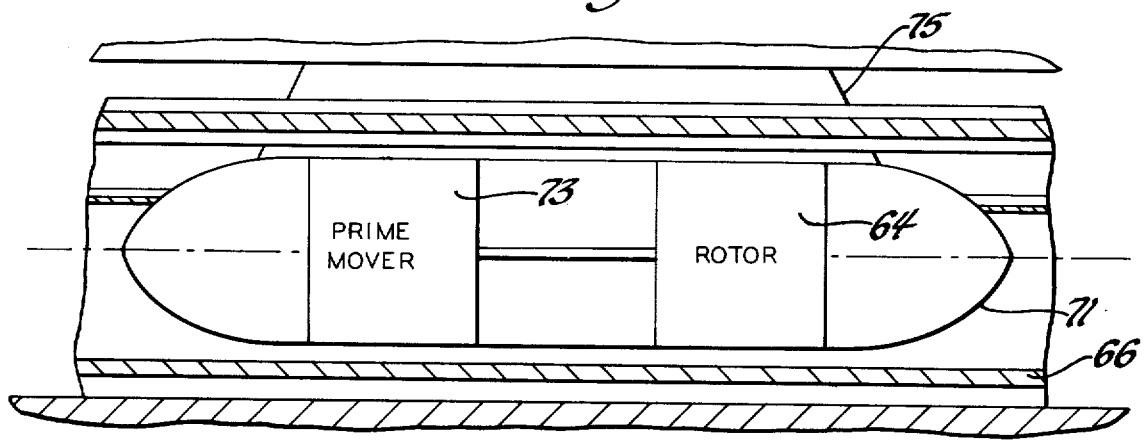
FIG. 11 is a side view of the rotor and rail in the configuration shown in FIG. 10.

FIG. 10 is a schematic of a propulsion system according to the present invention wherein the bimetallic rails substantially envelope the rotors. Ground support or lift elements 62 in the form of pads for an air cushion provide the primary levitation force for the vehicle 10 of FIG. 10 similarly to the pads 14 of FIG. 1. A rotor 64 is substantially enclosed by a bimetallic arcuate cross-section rail 66, and a rotor 68 is substantially enclosed by a bimetallic arcuate cross-section rail 70. FIG. 11 is a side view of the rotor 64 within an enclosure 71 all substantially enveloped by the tube or rail 66. A prime mover 73 is also carried within the enclosure 71 to drive the rotor 64. Electrical power is fed to the prime mover 73 through a connecting strut 75 interconnecting the vehicle 10 and the enclosure 71.

Figure 12:
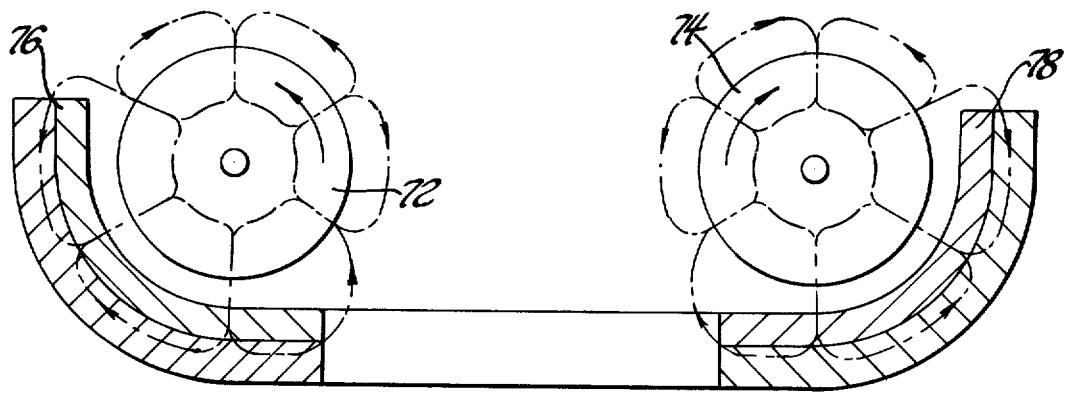
FIG. 12 is an enlarged view of the rotors and rails of a propulsion system wherein the rotors are nestled between the rails.
Figure 12A:
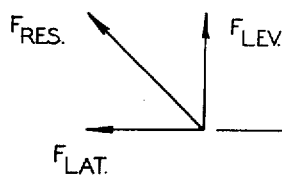
FIG. 12A is a vector diagram of the forces on the rotors of FIG. 12.
Figure 12A:
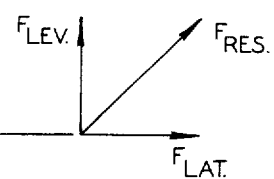

FIG. 12 is an enlarged view of the rotors and rails of a propulsion system wherein the rotors are nestled between the rails. Rotors 72 and 74 are nestled between rails 76 and 78 in FIG. 12. Rotation of the rotors 72 and 74 induces fields in the rails 76 and 78 in a manner analogous to that discussed above in connection with FIG. 2. FIG. 12A illustrates the forces developed during rotation by the rotors 72 and 74. Similarly to the forces in FIG. 2A, the forces of FIG. 12A have a levitating component and a lateral or stabilizing component. Naturally if the rails in FIG. 12 completely enclosed their respective rotors, the force vector diagram of FIG. 12A would not define the forces developed. When the rotors are fully enclosed, the forces are symmetrical on the rotor, each tangential component cancelling its associated diametrically opposed counterpart. The thrust system illustrated in FIG. 10 approaches more nearly the cancellation ideal of full enclosure than the force pattern of FIGS. 12 and 12A. The significant factor is that by appropriately selecting the rail-rotor arrangement, the forces generated on the rotor in the plane perpendicular to the rotor axis can be regulated.

Figure 13:
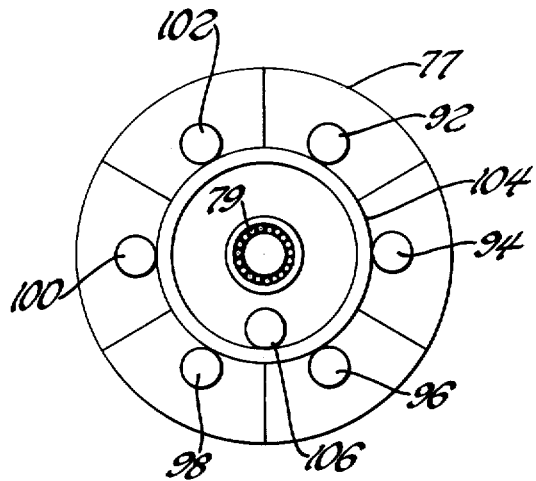
FIG. 13 is an end view of a rotor including means for axially displacing magnetic elements on the rotor to control the helix pitch of the helically distributed elements.
Figure 13A:
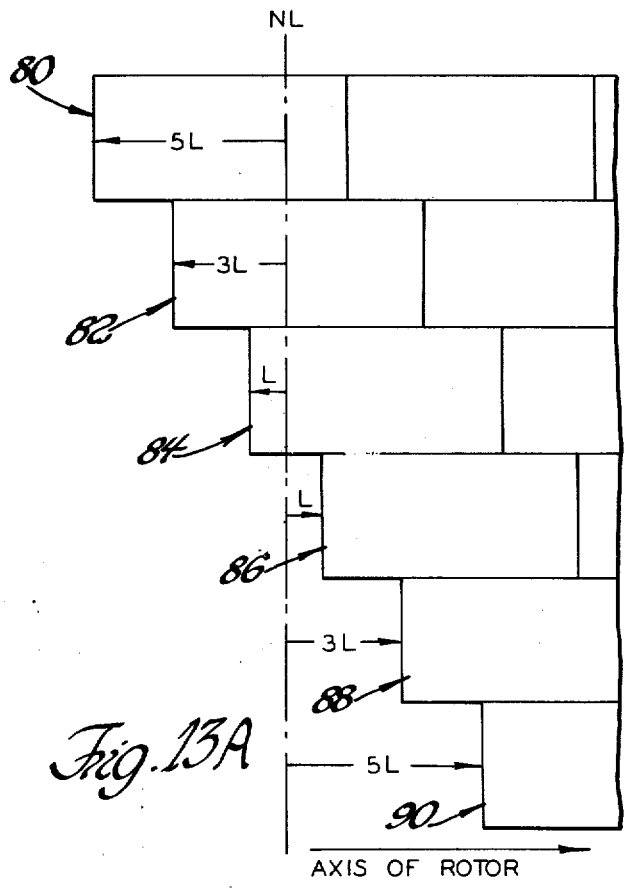
FIG. 13A is a sectioned plan view of magnetic elements axially displaced to set a predetermined helix pitch.

In FIG. 13 a control for the helix angle of a rotor 77 rotatably carried by a bearing 79 is illustrated wherein axial displacement of respective rows of magnetic elements is utilized to adjust the helix angle. As shown in FIG. 13A succeeding axial rows of magnetic elements are controllably displaced to control the helix pitch. In particular, for the arrangement shown, rows 84 and 86 were moved an increment L from the neutral line (N.L.) in opposite directions, rows 82 and 88 were moved an increment 3L in opposite directions, and rows 80 and 90 were moved an increment 5L in opposite directions. The requisite movement is achieved by gears 92, 94, 96, 98, 100, and 102 illustrated in FIG. 13. Each gear is connected by an attached screw (not illustrated) to an associated nut (not illustrated) on a respective axial row of magnetic elements. Each row of magnetic elements moves in unison when the screw attached to the nut of that row is driven. Gear 92 is attached through a screw and nut to drive the magnetic elements of row 80; gear 94 is attached through a screw and nut to drive the magnetic elements of row 82; gear 96 is attached through a screw and nut to drive the magnetic elements of row 84; gear 98 is attached through a screw and nut to drive the magnetic elements of row 86; gear 100 is attached through a screw and nut to drive the magnetic elements of row 88; and gear 102 is attached through a screw and nut to drive the magnetic elements of row 90. The threads on the screws attached to gears 92, 94, and 96 are cut with a right-hand helix with pitch ratios 5, 3, and 1 respectively, whereas the threads on the screws connected with gears 98, 100, and 102 are cut with a left-hand helix with pitch ratios 1, 3, and 5 respectively. An annular gear 104 meshes with all the gears 92–102. Rotation of the annular gear causes rotation of the six gears 92–102 and the connected screws. As noted, the screws engage mating nuts attached respectively to the rows of magnetic elements and motion is thereby achieved. The rate and direction of axial motion is controlled by the pitch of the thread of the respective screw and nut. Additionally the direction of the axial movement of the various magnetic elements can be controlled by the direction of rotation of the annular gear 104. The annular gear 104 meshes with a pinion 106 driven through a reversible gear motor (not illustrated). Accordingly, energization of the motor causes movement by the magnetic elements. The gear 104 is maintained stationary after adjustment by a magnetic clutch or a ratchet wheel (not illustrated).

Figure 14:
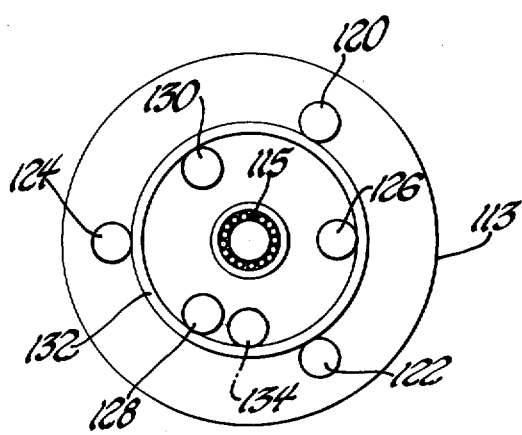
FIG. 14 is an end view of a rotor including means for circumferentially displacing magnetic elements on the rotor to control the helix pitch of the helically distributed magnetic elements.
Figure 14A:
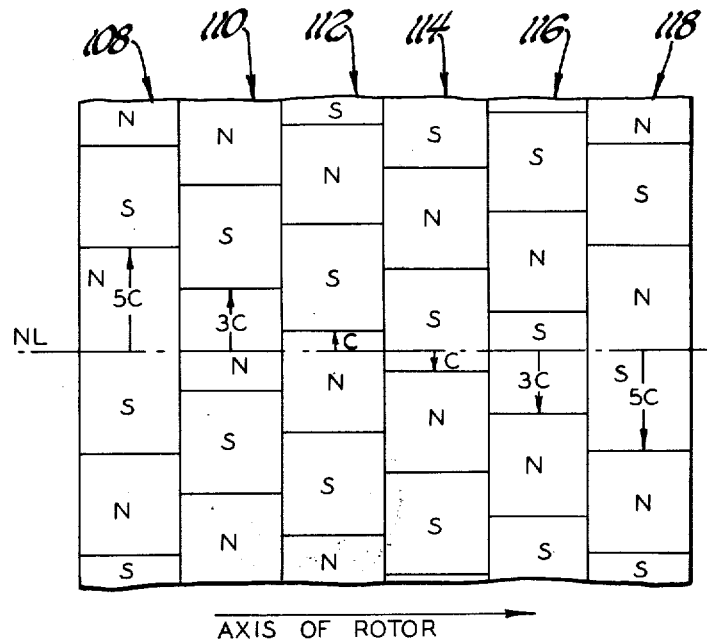
FIG. 14A is a sectioned plan view of magnetic element circumferentially displaced to set a predetermined helix pitch.

In FIG. 14 an arrangement is shown for circumferentially adjusting magnetic elements of a rotor 113 rotatably carried by a bearing 115. As shown in FIG. 14A succeeding circumferential rows of magnetic elements are controllably displaced to control the helix pitch. In particular, for the arrangement shown, rows 112 and 114 were moved an increment c from the neutral line (N.L.) in opposite directions, rows 110 and 116 were moved an increment 3c in opposite directions, and rows 108 and 118 were moved an increment 5c in opposite directions. The requiste movement is achieved by gears 120, 122, 124, 126, 128 and 130 illustrated in FIG. 14. Each of the circumferential rows of magnetic elements includes an annular gear (not illustrated), and each of the gears 120–130 is connected by an associated drive gear (not illustrated) to a respective annular gear to thereby controllably drive a respective circumferential row of magnetic elements. Each row of magnetic elements moves in unison when the annular gear attached to that row is driven. Gear 120 is attached through a drive gear and an annular gear to drive the magnetic elements of row 108; gear 122 is attached through a drive gear and an annular gear to drive the magnetic elements of row 110; gear 124 is attached through a drive gear and an annular gear to drive the magnetic elements of row 112; gear 126 is attached through a drive gear and an annaular gear to drive the magnetic elements of row 114; gear 128 is attached through a drive gear and an annular gear to drive the magnetic of row 116; and gear 130 is attached through a drive gear and an annular gear to drive the magnetic elements of row 118. The drive gears and the annular gears coacting with the gears 120, 122, and 124 provide gear ratios of 5, 3 and 1 respectively, whereas the drive gears and the annular gears coacting with the gears 126, 128, and 130 provide gear ratios of 1, 3, and 5 respectively. An annular gear 132 meshes with all the gears 120–130. Rotation of this annular gear 132 causes rotation of the six gears 120–130 and motion is thereby achieved. The rate and direction of circumferential motion is controlled by the gear ratio of the respective drive and annular gears. Since gears 120, 122, and 124 are on the outside of the annular gear 132 whereas gears 126, 128, and 130 are on the inside of the annular gear 132, the direction of rotation of the two sets of gears is opposite and the displacement of the associated rows of magnetic elements is likewise opposite. Additionally the direction of the circumferential movement of the various magnetic elements can be controlled by the direction of rotation of the annular gear 132. The annular gear 132 meshes with a pinion 134 driven through a reversible gear motor (not illustrated). Accordingly, energization of the motor causes movement by the magnetic elements. The gear 134 is maintained stationary after adjustment by a magnetic clutch or a ratchet wheel (not illustrated).

Although the foregoing has proceeded in terms of particular embodiments, it is to be understood that various changes and modifications could be engrafted thereon by one skilled in the art within the spirit and scope of the appended claims.

The embodiments of the invention in which an exclusive property or privilege is claimed are defined as follows:

1. A propulsion system for a vehicle of the type adapted to follow a fixed roadway comprising: at least one rotor rotatably carried by said vehicle and having an axis of rotation aligned with the axis of displacement of said vehicle; a prime mover carried by said vehicle and coupled to said rotor for rotation thereof; an elongated conductive rail disposed on said roadway along and defining a path of travel for said vehicle, said rotor being disposed in alignment with and adjacent to but spaced apart from said conductive rail; and means associated with said rotor for developing a circumferentially varying magnetic field pattern circulating about said rotor and a corresponding magnetic field pattern circulating about said conductive rail whereby rotation of said rotor produces reactive forces between said rotor and said rail.

2. A system as in claim 1, wherein said means associated with said rotor for developing magnetic fields comprises a plurality of magnetic elements helically distributed on said rotor, said magnetic elements being disposed to induce currents in said conductive rail during rotation by said rotor, said induced currents having associated magnetic fields interacting with the magnetic fields of said magnetic elements to develop forces on said rotor.

3. A system as in claim 2, wherein said plurality of magnetic elements comprising a plurality of permanent magnets.

4. A system as in claim 2 wherein said plurality of magnetic elements comprises a plurality of dc electromagnets.

5. A system as in claim 2, including means for adjusting the helix pitch of said plurality of magnetic elements.

6. A system as in claim 2, including means for adjusting the helix pitch of said plurality of magnetic elements to reverse the thrust forces on said rotor to effect braking in said propulsion system.

7. A system as in claim 2, including means for adjusting the helix pitch of said plurality of magnetic elements to reverse the sense of said helix pitch to effect plugging to brake said propulsion system.

8. A system as in claim 5, wherein said means for adjusting the helix pitch of said plurality of magnetic elements includes means for respectively axially displacing said plurality of magnetic elements.

9. A system as in claim 5, wherein said means for adjusting the helix pitch of said plurality of magnetic elements includes means for respectively circumferentially displacing said plurality of magnetic elements.

10. A system as in claim 1, wherein said conductive rail comprises a bimetallic rail including an electrically conductive metallic portion and a ferromagnetic metallic portion.

11. A system as in claim 10, wherein said conductive rails is of arcuate cross-section.

12. A system as in claim 11, wherein said conductive rail substantially envelopes said rotor.

13. A system as in claim 11, including a second rotor mechanically coupled with said prime mover for rotation thereby; a second elongated conductive rail of arcuate cross-section; and a plurality of magnetic elements helically distributed on said second rotor, said magnetic element being disposed to induce currents in said second conductive rail during rotation by said second rotor, said induced currents of said second conductive rail having associated magnetic fields interacting with the magnetic fields of said plurality of magnetic elements distributed on said second rotor to develop forces on said second rotor.

14. A system as in claim 13, wherein said rotors and said conductive rails are disposed such that the magnetic fields of said rotors and said conductive rails interact to develop levitating forces on said rotors.

15. A system as in claim 13, wherein said rotors and said conductive rails are disposed such that the magnetic fields of said rotors and said conductive rails interact to develop lateral stabilizing forces on said rotors.

16. A system as in claim 13, wherein said rotors and said conductive rails are disposed such that the magnetic fields of said rotors and said conductive rails interact to develop thrust, levitating, and lateral forces on said rotors.

17. An electromagnetic propulsion system comprising: a prime moves for developing rotary motion; a rotor mechanically coupled with said prime mover for rotation thereby; a stationary elongated conductive rail disposed in proximity to said rotor; and means for developing magnetic fields in both said rotor and said conductive rail during rotation by said rotor, said magnetic fields interacting to develop forces on said rotor.

18. An electromagnetic propulsion system comprising: a vehicle; means defining a path of travel for said vehicle and including a conductive element extending along said path of travel and having an arcuate section taken perpendicular to said path of travel; and means including direct current electromagnet elements or permanent magnet elements movably carried by the vehicle and arranged to produce a spatially phase-varying helical electromagnetic field configuration proximate to and reacting with said conductive element to drive the vehicle along said path.

* * * * *